United States Patent
Peveling et al.

(10) Patent No.: US 7,017,083 B1
(45) Date of Patent: Mar. 21, 2006

(54) METHOD AND DEVICE FOR TESTING THE INHIBIT FUNCTION OF A NETWORK COMPONENT TRANSMISSION INHIBITING DEVICE

(75) Inventors: Wolfgang Peveling, Backnang (DE); Simône Schumacher, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/582,686

(22) PCT Filed: Jul. 13, 1999

(86) PCT No.: PCT/DE99/02158

§ 371 (c)(1),
(2), (4) Date: Aug. 21, 2000

(87) PCT Pub. No.: WO00/27078

PCT Pub. Date: May 11, 2000

(30) Foreign Application Priority Data

Oct. 30, 1998 (DE) ................................ 198 50 065

(51) Int. Cl.
*G06F 11/00* (2006.01)

(52) U.S. Cl. ........................................ 714/44; 702/120

(58) Field of Classification Search ............ 714/43–44, 714/48–56; 710/105–106, 107, 110; 702/120
See application file for complete search history.

(56) References Cited

U.S. PATENT DOCUMENTS

| | | | | |
|---|---|---|---|---|
| 4,642,636 A | * | 2/1987 | Smith et al. | 340/870.04 |
| 4,998,069 A | * | 3/1991 | Nguyen et al. | 324/539 |
| 5,161,162 A | * | 11/1992 | Watkins et al. | 714/43 |
| 5,600,782 A | * | 2/1997 | Thomson | 714/4 |
| 5,604,735 A | * | 2/1997 | Levinson et al. | 370/360 |
| 6,031,823 A | * | 2/2000 | Hormel et al. | 370/249 |
| 6,115,831 A | * | 9/2000 | Hanf et al. | 714/43 |
| 6,453,014 B1 | * | 9/2002 | Jacobson et al. | 379/26.01 |
| 6,600,723 B1 | * | 7/2003 | Reeb et al. | 370/245 |

FOREIGN PATENT DOCUMENTS

DE 37 26 742 2/1989

OTHER PUBLICATIONS

U.S. Appl. No. 60/081,486, Jacobson et al.*
CAN Specification 2.0, Robert Bosch GmbH, 1991.*

* cited by examiner

*Primary Examiner*—Tim Vo
*Assistant Examiner*—Clifford Knoll
(74) *Attorney, Agent, or Firm*—Kenyon & Kenyon

(57) ABSTRACT

A method and a device are described for testing the inhibit function of a network component transmission inhibiting device that allows a transmission line from the network component to the network to be inhibited by an inhibit function which causes a logical signal to be applied to a first node. The method includes the steps of: tapping the potential of the transmission line and feeding the tapped potential back to the network component; activating the inhibit function; transmitting a predetermined test signal message from the network component to the network via the transmission line during activated inhibit function; and testing the inhibit function by analyzing the fed back tapped potential in the network component.

7 Claims, 1 Drawing Sheet

PRIOR ART

METHOD AND DEVICE FOR TESTING THE INHIBIT FUNCTION OF A NETWORK COMPONENT TRANSMISSION INHIBITING DEVICE

FIELD OF THE INVENTION

The present invention relates to a method and a device for testing the inhibit function of a network component transmission inhibiting device that allows a transmission line from the network component to the network to be inhibited by an inhibit function which causes a logical signal to be applied to a first node.

BACKGROUND OF THE INVENTION

Although applicable to arbitrary networks, the present invention and its underlying problem are explained with regard to a network component transmission inhibiting device of a network that is located on board a motor vehicle, namely the CAN transmission inhibit function (CANSTOP) of the real-time capable serial bus system "Controller Area Network" (CAN).

In modern motor vehicles, provision is made for network components (control units, sensor devices, actuator devices) having unique addresses and linked over a bus such as the CAN bus, the network components being able to exchange messages having a clear assignment between the same. An example of such a network component is a proximity control device which is used in a motor vehicle for automatic proximity control.

The underlying problem of the present invention lies generally in that, in certain cases, it is required to decouple such a network component from the network or to inhibit its transmission function to the network by a safety device in the form of network component transmission inhibiting device.

FIG. 2 shows such a known transmission inhibiting device for a CAN network component.

In FIG. 2, [reference numeral] 100 designates a vehicle CAN bus, 10 [designates] a controller of a proximity control device, 20 a transmission inhibit signal generating device, 15 a CAN control section of controller 10 (usually a microcontroller), 151 a TX transmission port of CAN control section 15, 152 an RX receive port of CAN control section 15, 30 a CAN transmission/receiving device, TX a transmission line, RX a receive line, CANH a CAN high-level line, CANL a CAN low-level line, S1 a switch, SS an inhibit signal line, K1 a first node, R a resistance, and V+ a supply potential.

During normal operation, controller 10, via its CAN control section 15, sends signal messages over unidirectional transmission line TX to CAN transmission/receiving device 30 from where, via CAN high-level line CANH and CAN low-level line CANL, the signal messages are sent to the remaining network components over vehicle CAN bus 100. Likewise, the controller, via unidirectional receive line RX, receives signal messages which are addressed to it from CAN transmission/receiving device 30.

With the assistance of transmission inhibit signal generating device 20, which, in the present example, is a digital signal processor (DSP) it is possible for faults to be detected in controller 10, either directly via a link (not shown) or indirectly via other components (not shown either).

In response thereto, transmission inhibit signal generating device 20 outputs an inhibit signal to switch S1 via inhibit signal line SS, the inhibit signal closing the switch and, consequently, connecting first node K1 on transmission line TX to supply potential V+. Because of this, transmission line TX is constantly at a logical "1" or "H" level, resulting in that no data, i.e., level variations H->L or L->H, can be transmitted. Consequently, the link of controller 10 to vehicle CAN bus 100 is inhibited and, therefore, unwanted or unpredictable reactions of other network components on vehicle CAN bus 100, for example, in the form of control units, can be prevented.

In this context, resistance R, which is located between first node K1 and transmission port 151 connected to transmission line TX protects TX transmission port 151 from supply potential V+.

In the above conventional design approach, it has turned out to be a disadvantage that this transmission inhibiting device, which is composed of transmission inhibit signal generating device 20, inhibit signal line SS, switch S1 and supply potential V+, cannot be tested by controller 10 without an additional testing device since the reaction in appertaining CAN control section 15, which is usually an integral component of the controller, does not furnish any clear conclusions in the OK case of the transmission inhibiting device.

In particular, the OK case (transmission inhibiting device works) cannot be distinguished from the case in which the CAN bus connection to controller 10 is interrupted, i.e., for example, in which transmission line TX and/or receive line RX and/or CAN high-level line CANH and/or CAN low-level line CANL is/are interrupted or transmission/receiving device 30 has a defect.

Since in both cases, CAN control section 15 generates the same fault flags or markers in its internal evaluable registers if, in response to an attempt to transmit a signal message over transmission line TX, it does not receive an acknowledge response via receive line RX within a certain time. In other words, in all these cases, it detects the presence of a decoupling from vehicle CAN bus 100.

Consequently, conventional methods using an additional device are disadvantageous in so far as they require a large expense and operating effort.

SUMMARY

The testing method according to the present invention and as the corresponding testing device have the advantage over the conventional design approach that they provide a simple internal way of testing the inhibit function without requiring an external intervention in the respective network component itself.

No additional hardware is required since the method is very simple and needs very little computing time. In other words, a minimum software overhead is sufficient. Also, the method works without the cooperation with the remaining network components, i.e., without the bus connection itself.

The basic idea of the present invention is that a feedback loop is laid from the transmission line to the network component, the feedback loop, during activated inhibit function, making it possible to distinguish between a malfunction of the network component transmission inhibiting device and an interruption of the CAN bus connection to the controller. In the first case, in fact, a predetermined test signal message is fed back to the network component whereas in the second case, it is not.

According to an embodiment, the potential of the transmission line is tapped at a second node which is located between the first node and the transmission port of the network component, the transmission port being connected to the transmission line. This has the advantage that, the closer the second node is located to the transmission port, the more insensitive it is to a potential electrical interruption.

In another example embodiment, the network component is a controller, in particular, a microcontroller having an interrupt function which can be controlled via an interrupt port. In this case, the tapped potential is fed back to the interrupt port, and the inhibit function is tested by analyzing whether or not an interrupt is triggered. Utilizing an interrupt means having no loss of computing time since the controller hardware responds to an edge change with an interrupt signal.

According to a further example embodiment, the network component is a controller, in particular a microcontroller, having a scannable input port. In this case, the tapped potential is fed back to the scannable input port, and the inhibit function is tested by analyzing the signal at the scanned input port. Here, polling is used which means that the controller pin is permanently interrogated. During this time, no other processor computing function can indeed be carried out but no interrupt-capable controller port is required either, which, in many applications, does actually not exist.

According to another example embodiment, the logical signal is applied to the first node by closing a switch which is located between the first node and a supply potential.

DETAILED DESCRIPTION

Figure 1:
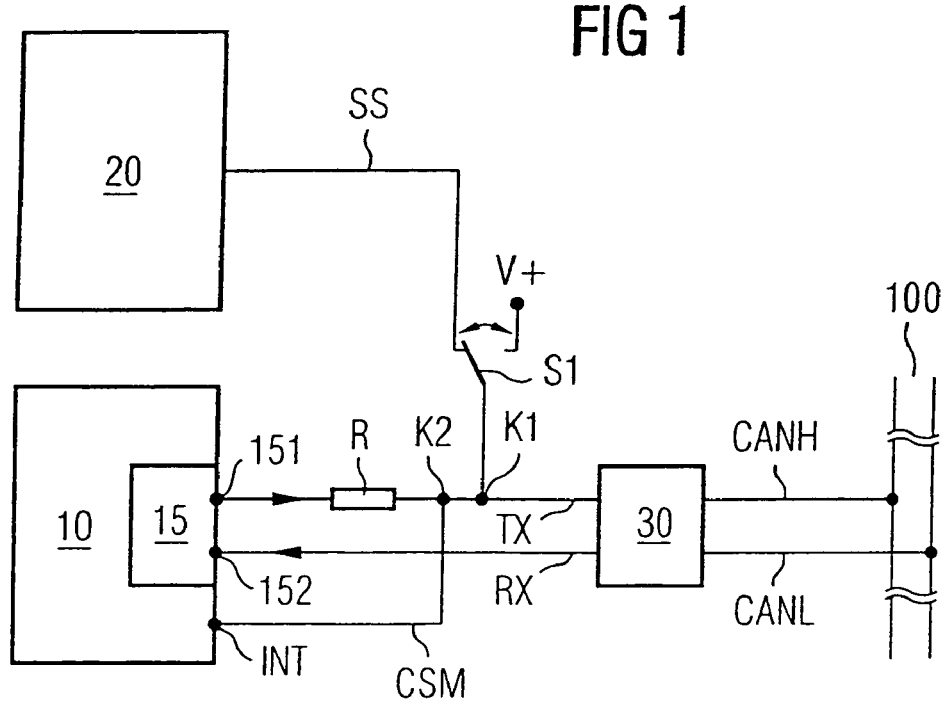
FIG. 1 shows a testing device for a known transmission inhibiting device for a CAN network according component to an exemplary embodiment of the present invention.
Figure 2:
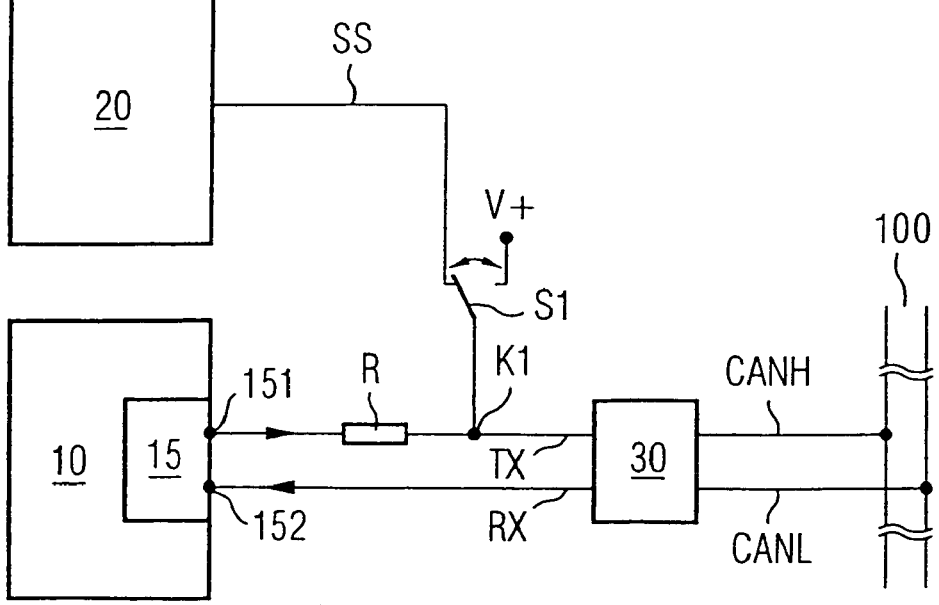
FIG. 2 shows the known transmission inhibiting device for a CAN network component.

FIG. 1 shows a testing device for a conventional transmission inhibiting device for a CAN network component as exemplary embodiment of the present invention, identical reference symbols as in FIG. 1 designating identical or functionally identical elements.

In FIG. 1, in addition to the reference symbols already introduced, CSM designates a test signal line, INT an interrupt port of controller 10, and K2 a second node.

In the exemplary embodiment, provision is made for a test signal line CSM for tapping the potential of transmission line TX at second node K2 which is located between first node K1 and transmission port 151 of network component 10 in the form of the controller, the transmission port being connected to transmission line TX. The test signal line carries the potential of transmission line TX tapped at node K2 to interrupt port INT.

In the illustrated exemplary embodiment, the testing method operates as follows.

During a test, transmission inhibit signal generating device 20 in the form of the digital signal processor activates the inhibit function in response to a prompt by controller 10.

If the transmission inhibiting device, which is composed of transmission inhibit signal generating device 20, inhibit signal line SS, switch S1 and supply potential V+, altogether works, this activation causes logical signal H to be applied to first node K1 and, consequently, inhibits transmission line TX. However, if a component of the transmission inhibiting device is defective, no inhibition takes place.

To test this, controller 10 thereupon transmits a predetermined test signal message, for example, a simple signal level transition (H->L), to the network via transmission line TX during the inhibit function activated in response to a prompt by the controller. The test signal message is expediently configured in such a manner that it is plausible and, consequently, cannot disturb other network components, in particular control units in case the inhibit function does not work (NOK case).

Then, the inhibit function is tested by analyzing the tapped potential fed back to interrupt port INT during the transmission of the predetermined test signal message. If the transmission inhibiting device works correctly, no data reaches interrupt port INT of controller 10, i.e., no interrupt is triggered. If the transmission inhibiting device is defective, then an interrupt is triggered since the permanent application of logical signal H to first node K1 does not happen, and signal level transition (H->L) mentioned as an example can therefore occur.

The information obtained in this manner makes it possible to unequivocally recognize a properly working inhibit function.

Although the present invention is described above on the basis of a preferred exemplary embodiment, it is not limited thereto but can be modified in many ways.

In particular, it is possible for the testing device according to the present invention to be used not only for CAN modules on board of a motor vehicle but for any network having arbitrary network components.

Also, the potential tap at node K2 may be located at a different point of transmission line TX; however, expedient is an arrangement which is located very closely behind TX transmission port 151 or upstream of transmission port 151 in the CAN control unit itself so that the probability of an interruption upstream of (i.e., in FIG. 1, to the left of) node K2, which cannot be detected by this method, is kept extremely low.

The tapped potential of transmission line TX needs not necessarily be fed back to an interrupt-capable controller port. Any controller port that can be interrogated or polled, preferably by software, for a level variation is suitable for this.

What is claimed is:

1. A method for testing an inhibit function of an inhibit device coupled to a transmission line at a first node, the transmission line being coupled to a network component at a transmission port, a feedback line being coupled to the network component at a feedback port, and the feedback line being coupled to the transmission line at a second node, the method comprising:

applying a logical signal to the first node from the inhibit device, wherein the logical signal is applied by closing a switch located between the first node and a supply potential, and wherein the state of the logical signal indicates whether the inhibit function is active;

transmitting a test signal message onto the transmission line at the transmission port while the logical signal is applied to the first node; and analyzing a feedback signal at the feedback port;

wherein the network component is a microcontroller having an interrupt function that can be controlled via the feedback port, and wherein the inhibit function is tested by analyzing whether the interrupt function is triggered when the inhibit function is active.

2. The method according to claim 1, wherein the network component is a microcontroller having a scannable feedback port, and wherein the inhibit function is tested by analyzing a signal at the scanned feedback port.

3. A device for testing an inhibit function of a network component transmission-inhibiting device used for inhibiting a transmission line between the network component and a network by performing the inhibit function that causes a logical signal to be applied to a first node of the transmission line, the device comprising:
  a feedback line coupled to a feedback port of the network component and to a second node of the transmission line;
  a test-signal-message-transmitting device to transmit a test signal message from a transmission port of the network component to the network via the transmission line in response to an activated inhibit function, wherein the state of the logical signal indicates whether the inhibit function is active; and
  a testing device to test the inhibit function by analyzing a signal at the feedback port during transmission of the test signal message;
  wherein the transmission inhibiting device includes: a transmission-inhibit-signal generating device to generate an inhibit signal during activation of the inhibit function; and a switching device interposed between a supply potential and the first node, the switch being closed in response to the inhibit signal; and
  wherein the network component is a microcontroller having an interrupt function that can be controlled via the feedback port, and wherein the inhibit function is tested by analyzing whether the interrupt function is triggered when the inhibit function is active.

4. The device according to claim 3, further comprising:
  a resistance provided between the first node and the transmission port.

5. The device according to claim 3, wherein the feedback line is coupled to the second node of the transmission line between the first node and the transmission port.

6. The device according to claim 3, wherein the feedback line is connected to the second node of the transmission line between the first node and the network.

7. The device according to claim 3, wherein the network component includes a Controller Area Network (CAN) controller connected via the transmission line to a CAN transmission/receiving device that is in turn connected to a CAN bus.

* * * * *

UNITED STATES PATENT AND TRADEMARK OFFICE
CERTIFICATE OF CORRECTION

| | | |
|---|---|---|
| PATENT NO. | : 7,017,083 B1 | Page 1 of 1 |
| APPLICATION NO. | : 09/582686 | |
| DATED | : March 21, 2006 | |
| INVENTOR(S) | : Wolfgang Peveling et al. | |

It is certified that error appears in the above-identified patent and that said Letters Patent is hereby corrected as shown below:

Column 1, line 15, change "OF THE INVENTION" to --INFORMATION--;

Signed and Sealed this

Twenty-first Day of November, 2006

JON W. DUDAS
*Director of the United States Patent and Trademark Office*